United States Patent [19]

Subblah et al.

[11] Patent Number: 6,128,659
[45] Date of Patent: Oct. 3, 2000

[54] METHOD AND APPARATUS FOR RESOLVING DYNAMIC CHANNEL ASSIGNMENT CONFLICT IN AAL2 NEGOTIATION PROCEDURE

[75] Inventors: Baranitharan Subblah, Chelmsford; Sudhir Dixit, Weston, both of Mass.

[73] Assignee: Nokia Telecommunications, Oy, Espoo, Finland

[21] Appl. No.: 09/028,804

[22] Filed: Feb. 24, 1998

[51] Int. Cl.[7] .......................... G06F 13/14; H04L 12/413
[52] U.S. Cl. .......................... 709/225; 709/209; 709/240; 370/230; 370/395
[58] Field of Search ................................ 370/230, 395, 370/410, 431, 462, 455; 709/225, 240, 209

[56] References Cited

U.S. PATENT DOCUMENTS

| 5,872,771 | 2/1999 | Park et al. | 370/252 |
|---|---|---|---|
| 5,875,174 | 2/1999 | Okazaki | 370/230 |
| 5,881,049 | 3/1999 | Beshai et al. | 370/230 |
| 5,894,471 | 4/1999 | Miyagi et al. | 370/230 |
| 5,907,536 | 5/1999 | Foglar | 370/230 |
| 5,928,345 | 7/1999 | Tetzlaff et al. | 710/107 |
| 5,933,426 | 8/1999 | Motori | 370/352 |
| 5,933,607 | 8/1999 | Tate et al. | 709/240 |
| 5,940,393 | 8/1999 | Duree et al. | 370/392 |

OTHER PUBLICATIONS

Mauger, R. et al., "ATM Adaptation Layer Switching", XVI World Telecom Congress Proceedings, pp. 207–214 (Sep. 21, 1997).

Tanabe, S. et al., "A New Distributed Switching System Architecture for B–ISDN", International Conference on Integrated Broadband Services and Networks, pp. 258–263 (Oct. 15, 1990).

Primary Examiner—Ahmad F. Matar
Assistant Examiner—Abdullahi E. Salad
Attorney, Agent, or Firm—Altera Law Group, LLC

[57] ABSTRACT

A peer-to-peer communication system for resolving dynamic channel assignment conflict in a channel assignment in a AAL2 negotiation procedure. The peer-to-peer communication system includes at least one pair of peer entities connectable by a channel having a channel identification, one peer entity of the pair of peer entities having a higher priority status than the other peer entity. When one peer entity of the pair of peer entities requests a same channel as the other peer entity, the channel is assigned to one peer entity which has the higher priority status. The higher priority status is alternated between the pair of the peer entities after each channel conflict.

18 Claims, 7 Drawing Sheets

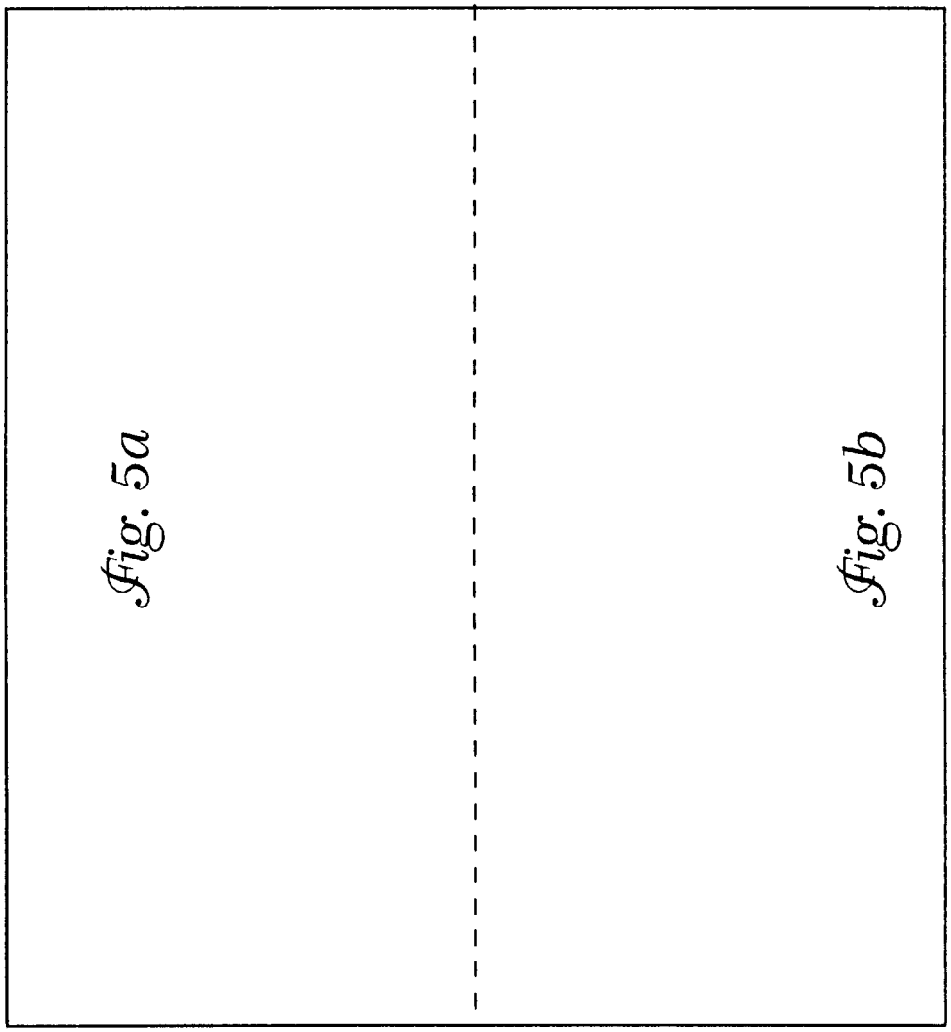

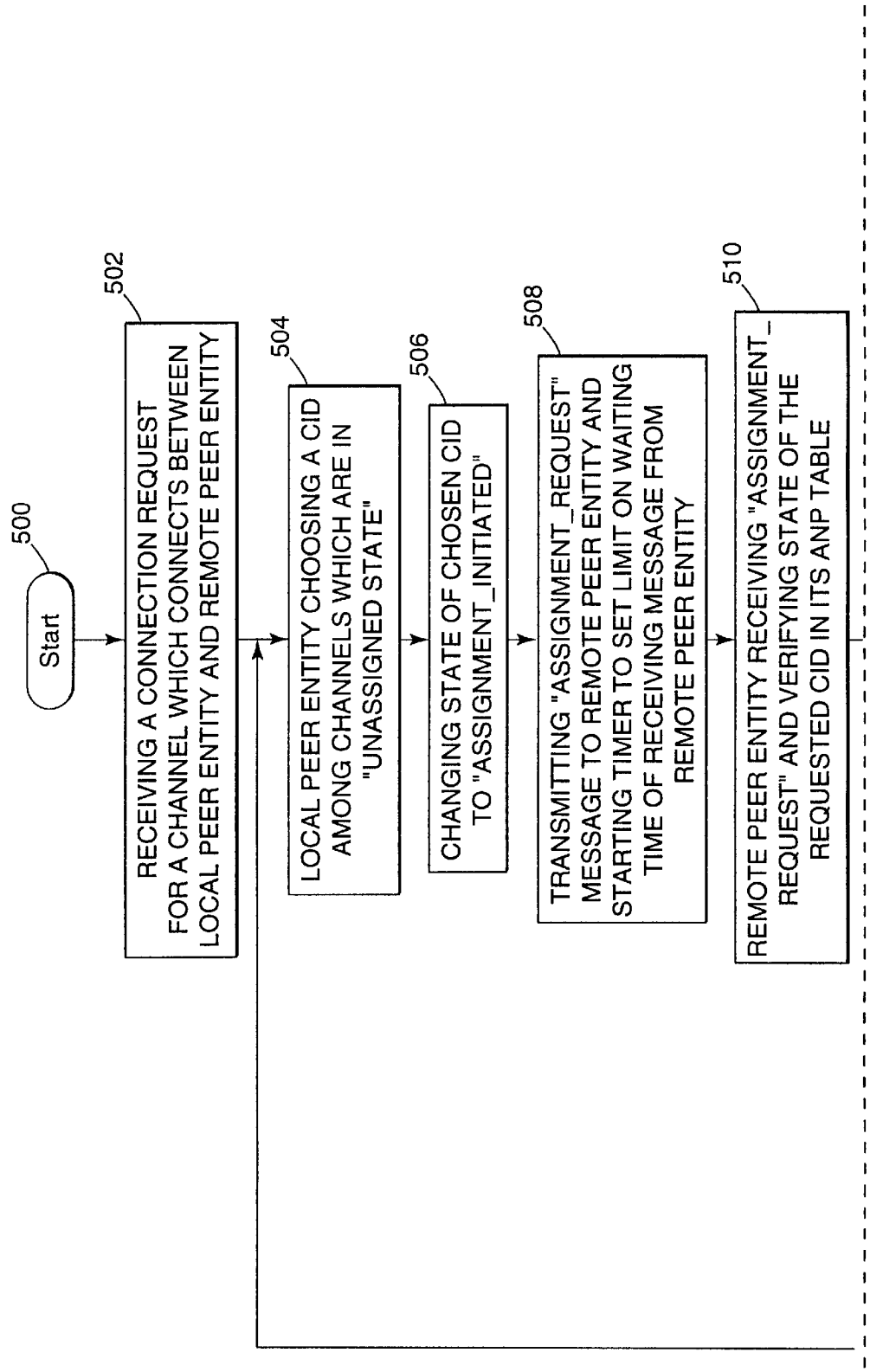

METHOD AND APPARATUS FOR RESOLVING DYNAMIC CHANNEL ASSIGNMENT CONFLICT IN AAL2 NEGOTIATION PROCEDURE

BACKGROUND OF THE INVENTION

1. Field of the Invention

This invention relates in general to a dynamic channel assignment method and system, and in particular, to a method and system for resolving a dynamic channel assignment conflict in AAL2 (ATM Adaptive Layer 2) Negotiation Procedures (ANP).

2. Description of Related Art

ATM has been selected as a world standard for broadband ISDN in network communication systems. ATM systems have been implemented on a global basis and developed in a rapid growth. ATM technology is destined to play a major role in both public and private broadband networks. AAL2 is one of the four types of AAL (ATM Adaptive Layer) protocols which have been recommended by CCITT, namely AAL1, AAL2, AAL3/4 and AAL5. In general, the layer services provided by AAL1 are constant bit rate (CBR) services which require information to be transferred between source and destination at a constant bit rate. AAL2 offers a transfer of information with a variable bit rate. In addition, timing information is transferred between source and destination. Since the source is generating a variable bit rate, it is possible that cells are not completely filled and that filling level varies from cell to cell. AAL3/4 is used for transfer of data which is sensitive to loss, but not sensitive to delay. AAL3/4 protocol may be used for connection oriented as well as for connectionless data communication. AAL3/4 itself does not perform all functions required by a connectionless service, since functions like routing and network addressing are performed on the network layer. AAL5 is designed to offer a service with less overhead and better error detection below the CPCS layer.

In a AAL2 protocol, AAL2 Negotiation Procedure (ANP) is a ITU-T recommendation for establishing peer-to-peer AAL2 channels on a single ATM connection, which is introduced in BISDN ATM Adaptation Layer 2 specification—(Annex C Dynamic allocation of AAL type 2 channels) published as a draft recommendation I.363.2 (Madrid, November 1996), approved in September 1997 (hereinafter "Recommendation"). The framework, protocol, and associated procedures are introduced to support a dynamic allocation of AAL type 2 channels. In the recommendation, there is a specific need to enable dynamic allocation of AAL type 2 channels which would allow, assign and remove (make unassigned) AAL2 channels according to the need of AAL2 connectivity as requested by an AAL2 user. The function providing a dynamic allocation of AAL2 channels is often called AAL2 Negotiation Procedures (ANP) and is carried out by an AAL2 layer management entity at each side of an AAL2 link or channel. The AAL2 layer management entity uses the services provided by the AAL2 entities for the purpose of transmitting and receiving messages defined for ANP. These messages are communicated between two peer AAL2 management entities over an AAL2 link or channel. To simplify the description, the peer AAL2 layer management entity is below referred to as AAL2 peer entity or just peer entity.

During the ANP, a Channel IDentifier (CID) is associated between peer-to-peer AAL2 entities for each connection request whereby voice or other signal packets from different users are multiplexed and demultiplexed using the CID on a single ATM connection. Generally, the size of a CID field is 8 bits, and a maximum of 256 simultaneous connections (248 of which are generally available for users and 8 of which are generally for system management use) can be supported on a single ATM connection at any given time. According to the Recommendation, during ANP, the state of the CID varies among "Unassigned", "Assignment_initiated", "Assigned", and "Removal_initiated" states. At any given time, a particular CID is in one of the above listed states. Further according to the Recommendation, the negotiation procedure between the peer-to-peer entities is carried out using predefined messages, such as "Assignment_request", "Assignment_confirm", "Assignment_denied", "Removal_request", "Removal_confirm", "Status_pool", and "Status_response".

The existing AAL2 negotiation procedure is generally shown in FIG. 1. FIG. 1 shows a message sequence chart which describes the ANP between local and remote peer entities in details. The message sequence starts from the left top side at the local peer entity. Upon receiving a connection request from a user, the local peer entity chooses a Channel Identification (CID) among the channels which are in "unassigned" state from an ANP memory (e.g. represented by a table) at the local peer entity. The state of the chosen CID is then changed to "Assignment_initiated", and an "Assignment_request" message is sent to a remote peer entity on the right side. The "Assignment_request" message may be sent to the remote peer entity on a dedicated AAL2 channel or link. Meanwhile, the local peer entity starts a $T_{assign}$ timer to set a maximum limit on the waiting time to receive a confirm or denial message from the remote peer entity. Once the remote peer entity received the "Assignment_request", the remote peer entity verifies the state of the requested CID in its own ANP memory (e.g. represented by a table) associated with the remote peer entity. If the requested CID is in an "unassigned" state, then the CID is assigned to the requester, i.e. the local peer entity. Meanwhile, an "Assignment_confirm" message as a reply message is returned to the requested local peer entity. If the CID request cannot be satisfied for reasons such as the CID assigned already state, CID being in "Assigmnent_initiated" state, or CID being in "Removal_initiated" state, the remote peer entity then sends "Assignment_denied" as a reply message to the local peer entity. Thereafter, the local peer entity either completes the channel assignment or releases the "Assignment_initiated" channel at the local peer entity based on the reply message from the remote peer entity.

Generally, the CIDs available for each AAL2 channel are limited to 256 simultaneous connections (248 of which are generally available for users and 8 of which are generally for system management use), and the peer entities are symmetrical in their functionality regarding channel assignment requests. In existing systems, there is no provision for one peer entity to find out the status of its requested CID at a remote peer entity. Due to this reason, if both local and remote peer entities receive channel assignment requests asynchronously and the same CID is chosen for respective channel assignment request at each peer entity, a conflict of using the same CID may occur. For example, before receiving an "Assignment_request" message from the local peer entity, the remote peer entity may have received a channel assignment itself from another user requesting the same CID. Since the remote peer entity has not received the "Assignment_request" from the local peer entity, and if the same CID chosen by the local peer entity is also available by the remote peer entity, i.e. the chosen CID having an "unassigned" status in the ANP memory table associated with the remote peer entity, the remote peer entity may assign the same CID to the other user channel upon the channel assignment request. Meanwhile, the remote peer entity sends an "Assignment_request" message to the local peer entity and changes the status of the CID in its ANP memory table to "Assignmnent_initiated". Afterwards, the remote peer entity receives the "Assignent_request" from the local peer entity and checks the status of the requested CID in its ANP memory table. Since the status of the CID had been changed to "Assignment_initiated", i.e. not in an "unassigned" state, the remote peer entity denies this CID request and sends an "Assignment_denied" message to the local peer entity. Similarly, when the "Assignment_request" sent by the remote peer entity reaches the local peer entity, the local peer entity checks its own ANP memory table for the status of the requested CID by the remote peer entity and finds that the status of the CID is "Assignment_initiated" because this is the same CID that the local peer entity had requested itself. Accordingly, the local peer entity sends an "Assignment_denied" message to the remote peer entity. Therefore, the conflict CID assignment results in both requests failing for the simple reason that they try to assign the same CID for two different requests on a single ATM connection. This causes tremendous delays for the channel connection. There was a scheme proposed to solve the problem whereby both peer entities would time out randomly after collision and retry the ANP. The main drawback of this scheme is that none of the channel assignments succeed, and additional delays are introduced by these random timers.

It can be seen that there is a need for a method and system to resolve the above-mentioned dynamic channel assignment conflict in AAL2 Negotiation Procedures.

It can also be seen that there is a need for a method and system to cause at least one of the conflicted channel assignments to succeed in a channel assignment without additional delays in the AAL2 Negotiation Procedures.

SUMMARY OF THE INVENTION

To overcome the limitations in the prior art described above, and to overcome other limitations that will become apparent upon reading and understanding the present specification, the present invention discloses a dynamic channel assignment method and system, and in particular, to a method and system for resolving a dynamic channel assignment conflict in AAL2 (ATM Adaptive Layer 2) Negotiation Procedures (ANP).

In general, the present invention solves the above-described problems by providing a M/S flag which is associated with each peer entity and used in resolving a conflict in a channel assignment. If there is a conflict in assigning a CID, then a peer entity which is designated as M(Master) denies a request for a channel assignment from the S(Slave) peer entity, and the S(Slave) peer entity accepts a request for a channel assignment from the M(Master) peer entity. Further in the present invention, after a conflict, at least one of the channel assignment requests is successful. Accordingly, the present invention improves the efficiency in a channel assignment, increases the call success rate, and does not introduce any additional delay. In addition, the present invention further provides that the M/S flags at both peer entities are alternated (M->S and S->M) after each collision, which provides each peer entity an equal opportunity to succeed on their local channel assignment. In another aspect, the M/S flags can be initialized and synchronized so that this conflict resolving scheme is guaranteed to succeed time to time.

In one embodiment, the present invention provides a peer-to-peer communication system in a channel assignment negotiation procedure. The peer-to-peer communication system includes at least one pair of peer entities connectable by a link or channel having an identification (e.g. a channel identification), one peer entity of at least the pair of peer entities having a higher priority status than the other peer entity of at least the pair of peer entities. Further, the system includes means for alternating the higher priority status between at least the pair of peer entities. Accordingly, when the one peer entity of at least the one pair of peer entities requests the same channel as the other peer entity of at least the pair of peer entities, the channel is assigned to one of at least the pair of peer entities which has the higher priority status, the higher priority status being alternated after completion of channel assignment.

One aspect of the present invention is that each of the first and second peer entities are first and second computer communication systems which are arranged to receive first and second channel requests for the same channel, respectively.

Another aspect of the present invention is that the first and second peer entities may be remotely located from each other, wherein collisions are easier to occur due to a transmission delay of reporting a Channel Identification (CID) status from one peer entity to the other peer entity.

The present invention is also a peer-to-peer communication system in a channel assignment negotiation procedure. The peer-to-peer communication system includes: a first peer entity, the first peer entity being arranged to receive a first channel request; a second peer entity, the second peer entity being arranged to receive a second channel request and connectable to the first peer entity via a channel having a channel identification; a first channel identification memory associated with the first peer entity storing a first status of the channel identification, the first status of the channel identification being changeable when the first channel request is received; a second channel identification memory associated with the second peer entity storing a second status of the channel identification, the second status of the channel identification being changeable when the second channel request is received; a first M/S memory associated with the first peer entity; a second M/S memory associated with the second peer entity, wherein the first and second M/S memories alternatively store a M status and a S status after a conflict of a channel assignment is resolved; and wherein when the second peer entity sends a second channel request having a channel identification to the first peer entity before the second peer entity receives a first channel request having the same channel identification from the first peer entity, the second peer entity sends either an assignment_confirm signal or an assignment_denied signal back to the first peer entity depending on the second M/S memory, such that when the second M/S memory has the M status, the assignment_denied signal is sent back to the first peer entity, and when the second M/S memory has the S status, the assignnent_confirm signal is sent back to the first peer entity.

The present invention also provides a method of peer-to-peer connection in a channel assignment negotiation procedure. The method includes the steps of: A) receiving a channel request at a first peer entity to connect to a second peer entity; B) checking a channel identification memory associated with the first peer entity and choosing a channel identification from the memory which has an unassigned status; C) sending an assignment request signal to the second peer entity and starting a timer for receiving a signal back from the second peer entity; D) changing the unassigned status of the chosen channel identification in the memory to an assignment_initiated status; E) receiving the assignment request signal from the first peer entity at the second peer entity; F) checking a channel identification memory associated with the second peer entity to determine whether the chosen channel identification has an unassigned status in the memory associated with the second peer entity: 1) if the chosen identification has the unassigned status in the memory associated with the second peer entity, sending an assignment_confirm signal back to the first peer entity, and transferring assignment from the first peer entity to the second peer entity; 2) if the chosen identification has an assignment_initiated status in the memory associated with the second peer entity, checking a M/S flag associated with the second peer entity: a) if the M/S flag is M, sending an assignment_denied signal back to the first peer entity, and repeating step B); b) if the M/S flag is S, sending the assignment_confirm signal back to the first peer entity, and transferring channel assignment from the first peer entity to the second peer entity; 3) if the chosen identification has an assigned status, sending the assignment_denied signal back to the first peer entity, and repeating step B); and 4) if the chosen identification has a removal_initiated status sending the assignment_denied signal back to the first peer entity and repeating step B). In one aspect of the present invention, the method further includes a step of initializing a M/S flag associated with the first peer entity and the M/S flag associated with the second peer entity such that one of the first and second peer entities is M and the other one is S.

One further aspect of the present invention is that the method includes a step of alternating the M and S of the M/S flag associated with the first peer entity and the M/S flag associated with the second peer entity every time after a conflict is resolved and one of the assignments is complete.

Additional aspect of the present invention is that additional peer entities are connectable to the either first or second peer entity such that the present invention is applicable to a multi-peer-to-single-peer communication system. In one embodiment, each of the additional peer entities is associated with a channel identification ANP memory table and a M/S flag.

Still another aspect of the present invention is that additional peer entities are connectable to the both first and second peer entities such that the present invention is applicable to a multi-peer-to-multi-peer communication system. In one embodiment, each of the additional peer entities is associated with a channel identification ANP memory table and a M/S flag.

The present invention is further an article of manufacture for a computer-based data processing system, the article of manufacture comprising a computer readable medium having instructions for causing a computer to perform a method comprising the steps of: A) receiving a channel request at a first peer entity to connect to a second peer entity; B) checking a channel identification memory associated with the first peer entity and choosing a channel identification from the memory which has an unassigned status; C) sending an assignment request signal to the second peer entity and starting a timer for receiving a signal back from the second peer entity; D) changing the unassigned status of the chosen channel identification in the memory to an assignment_initiated status; E) receiving the assignment request signal from the first peer entity at the second peer entity; F) checking a channel identification memory associated with the second peer entity to determine whether the chosen channel identification has an unassigned status in the memory associated with the second peer entity: 1) if the chosen identification has the unassigned status in the memory associated with the second peer entity, sending an assignment_confirm signal back to the first peer entity, and transferring assignment from the first peer entity to the second peer entity; 2) if the chosen identification has an assignment_initiated status in the memory associated with the second peer entity, checking a M/S flag associated with the second peer entity: a) if the M/S flag is M, sending an assignment_denied signal back to the first peer entity, and repeating step B); b) if the M/S flag is S, sending the assignment_confirm signal back to the first peer entity, and transferring assignment from the first peer entity to the second peer entity; 3) if the chosen identification has an assigned status, sending the assignment_denied signal back to the first peer entity, and repeating step B); and 4) if the chosen identification has a removal_initiated status, sending the assignment_denied signal back to the first peer entity and repeating step B).

Other embodiments of a system in accordance with the principles of the invention may include alternative or optional additional aspects. One such aspect of the present invention is that the means for alternating the higher priority status between at least the pair of peer entities may be configured as a one-bit register, in which the bit is changeable from 1–>0 or 0–>1 after every collision is resolved. Other equivalent alternative embodiments of the alternating means can be used without departure of the present invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a new approach to solve dynamic channel assignment conflict or collision in a communication system, such as a AAL2 Negotiation Procedure (ANP). It will be appreciated to a person skilled in the art that this approach can be used in other areas, especially communication areas, such as cellular-wide network systems, etc.

The acronym used in the present invention are as follows:

ATM: Asynchronous Transfer Mode

AAL2: ATM Adaptive Layer 2

ANP: AAL2 Negotiation Procedure

CID: Channel IDentification

ITU: International Telecommunications Union

CCITT: International Telephone and Telegraph Consultative Committee

BTS: Base Transmission (or Transceiver) System

MSC: Mobile Switching Center

M/S: Master/Slave

ANP is the ITU-T recommendation for establishing peer-to-peer AAL2 channels on a single ATM connection. During the ANP, a Channel Identifier (CID) is associated between peer-to-peer AAL2 entities for each connection request whereby signal packets, such as voice, data, video packets, etc., from different users are multiplexed and demultiplexed using the CID on a single ATM connection. The size of the CID field can be 8 bits whereby a maximum of 256 simultaneous connections (248 of which are generally available for users and 8 of which are generally for system management use) can be supported on a single ATM connection at any given time. According to the Recommendation, during ANP, the states of CID's varies among states, such as "Unassigned", "Assignment_initiated", "Assigned", and "Removal_initiated". At any given time, a particular CID may only be in one of the states. Further according to the Recommendation, the negotiation procedure between the peer-to-peer entities is carried out using the pre-defined messages such as "Assignment_request", "Assignment_confirm", "Assignment_denied", "Removal_request", "Removal_confirm", "Status_pool", and "Status_response".

Figure 1:
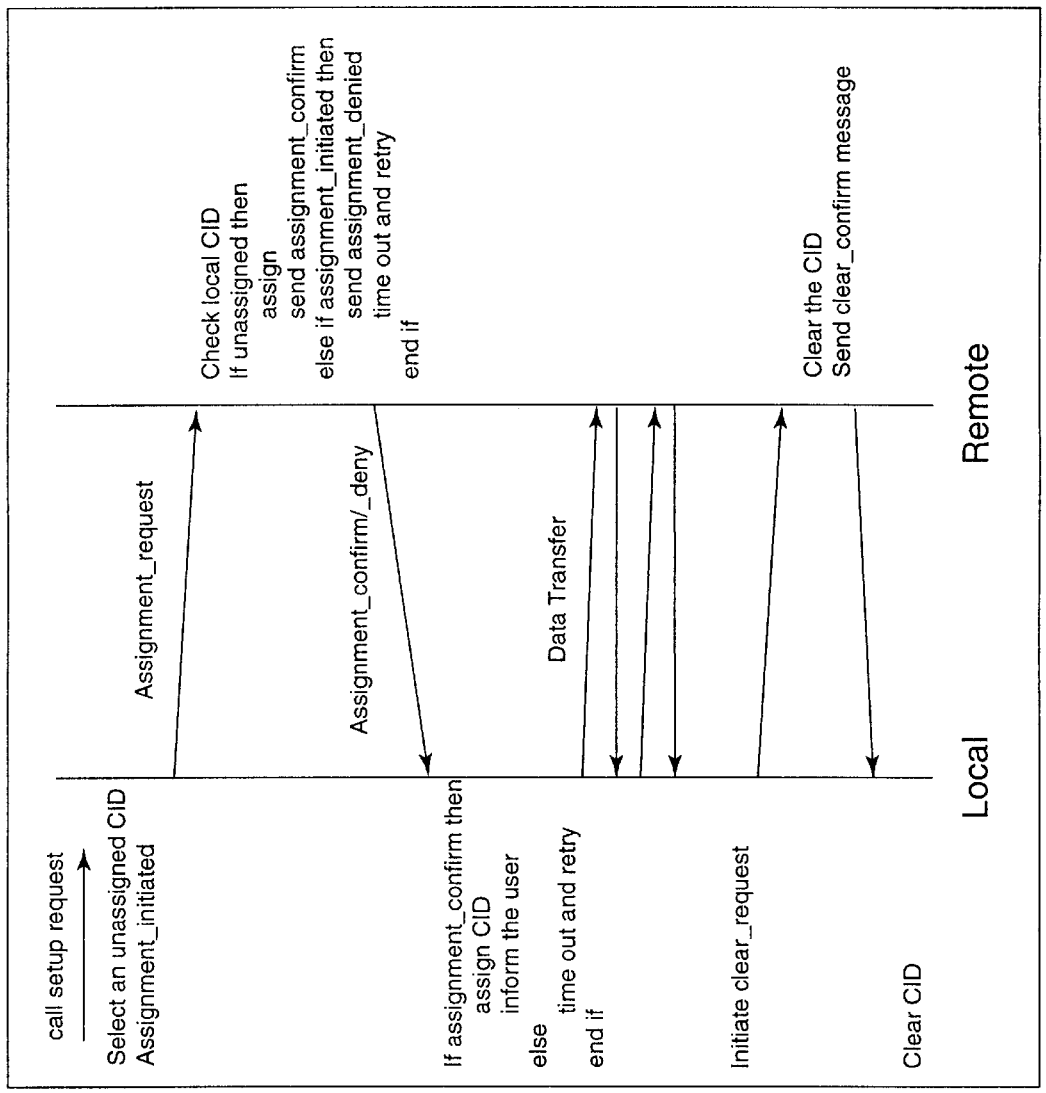
FIG. 1 illustrates a message sequence chart of an AAL2 Negotiation Procedure (ANP).

FIG. 1 illustrates a message sequence chart which describes the ANP operation between peer entities. The ANP operation starts from the up left corner with an arrow pointing horizontally to the right. The sequence is from the left to the right and then to the left again and so on and in an order from the top to the bottom. The left vertical line represents a local peer entity, and the right vertical line represents a remote peer entity. Short-sentence descriptions or pseudo-code descriptions are provided at the local and remote peer entities for illustration and understanding. It will be appreciated that the short-sentence descriptions or pseudo-code descriptions along with the detailed description of the preferred embodiment of the present invention would enable a person skilled in the art to implement the present invention in other embodiments without departure from the principles of the present invention.

As shown in FIG. 1, upon receiving a connection request from a user, "call setup request", the local peer entity chooses a CID among the channels which are in unassigned state. Each CID and its state are stored in a memory, preferably a table format, associated with the local peer entity. Since the memory is used during an ANP, the memory is often referred to as ANP memory table or ANP table (see FIGS. 2, 3, and 4). In one embodiment, the memory can be a part of the local peer entity. The local and remote peer entities can be a communication center or a computer station whereby a channel request call is received, switched, routed, transmitted (e.g. de/multiplexed) based on different services required by the user. It will be appreciated that a person skilled in the art would recognize that the peer entity can be any other types of communication system.

Continuing in the operation of FIG. 1, the state of the chosen CID is then changed to "Assignment_initiated" state in the memory table of the local peer entity, and an "Assignment_request" message or signal is sent to the remote peer entity. The "Assignment_request" message or signal is sent on a dedicated AAL2 channel, which is represented by a left-to-right arrow. Other channels can also be used to send the message or signal. Meanwhile, the local peer entity starts a $T_{assign}$ timer to set a maximum limit on a waiting time to receive an "Assignment_confirm" or "Assignment_denied" message or signal from the remote peer entity. If the timer runs out before the remote peer entity returns a message, a "time_out" signal is sent to the local peer entity.

Once the remote peer entity receives the "Assignment_request" message or signal, the remote peer entity verifies the state of the requested CID in an ANP memory table which is associated with or a part of the remote peer entity. If the requested CID is in an "Unassigned" state, then the remote peer entity assigns the requested CID to the local peer entity by returning an "Assignment_confirm" message or signal to the local peer entity.

If the requested CID cannot be satisfied for reasons such as CID in assigned already state, CID in "Assignment_initiated" state, or "Removal_initiated" state, then an "Assignment_denied" message is returned. CID in assigned already state is when the remote peer entity has assigned the requested CID to the local peer entity in an earlier request but the assigned CID has not been cleared yet. In this case, the local peer entity's request is denied, and it can start again by choosing a new "Unassigned" CID from the ANP table associated with the local peer entity or retry with the same CID. CID in "Assignment_initiated" state is when the remote peer entity receives a connection request from another user for the same CID before the remote peer entity receives the "Assignment_request" from the local peer entity. In this case, if the remote peer entity determines that the same CID is in an "Unassigned" state in its own ANP memory table, the state of the same CID is changed to "Assignment_initiated", and the remote peer entity sends out an "Assignment_request" message or signal to the local peer entity. Thereafter, when the remote peer entity receives the "Assignment_request" sent by the local peer entity earlier, the remote peer entity finds that the state of the requested CID is "Assignment_initiated". In the existing systems, the remote peer entity returns an "Assignment_denied" message or signal to the local peer entity. Similarly, when the "Assignment_request" from the remote peer entity is received by the local peer entity, the CID status in the ANP memory table associated with the local peer entity is still in the "Assignment_initiated" state. Accordingly, the local peer entity returns an "Assignment_denied" message or signal to the remote peer entity. As a result, a conflict or collision occurs, and neither channel assignment request is confirmed.

A pseudo-code description at the remote peer entity once it receives the "Assignment_request" from the local peer entity can be as follows in accordance with the above description:

```
Check its CID
IF unassigned THEN
    assign
        send assignment_confirm
ELSE (assigned or assignment_initiated or removal_initiated)
    send assignment_denied
    retry CID or new CID
END IF
```

Alternatively, the pseudo-code description at the remote peer entity once it receives the "Assignment_request" from the local peer entity can also be simplified as shown in FIG. 1 generally in accordance with the above description, provided that the CID states in the ANP table are rather limited to merely "Unassigned" and "Assignment_initiated". The simplified pseudo-code description is as follows:

```
Check its CID
IF unassigned THEN
    assign
        send assignment_confirm
ELSE (assigmnent_initiated)
    send assignment_denied
END IF
```

In either of the both embodiments, if the time runs out, a "time_out" signal is sent the local peer entity. The local peer entity either releases the CID so that the requested CID is returned to the "Unassigned" state and chooses a new "Unassigned CID" for the channel request, or retries the assignment request again with the same CID. It will be appreciated to a person skilled in the art that alternative operations can be used to provide similar services or response without departure from the scope and spirit of the present invention.

Further in FIG. 1, if the return message or signal from the remote peer entity is "Assignment_confirm" (as indicated by the second top arrow pointing from the right to the left), the local peer entity assigns the requested CID to the requested user and informs the user. If the return message or signal from the remote peer entity is "Assignrment_denied", the local peer entity retries the request with the same requested CID or a new "Unassigned" CID from the ANP memory table of the local peer entity. A simplified pseudo-code description is as follows:

```
IF assignment_confirm THEN
    assign CID
    inform the user
ELSE
    retry with the same CID or a new CID
END IF
```

It will also be appreciated that other pseudo-code descriptions can be used without departing from the principles of the present invention.

Still in FIG. 1, when the requested CID is assigned, the channel between the local and remote peer entities is designated for the requester's data transfer, as shown by the four representative arrows in proximate a middle portion of FIG. 1. The left-to-right arrows represent the data being transferred, and the right-to-left arrows represent confirmations of the data being transferred. Until the data transfer is completed, the channel is occupied with the CID being in an "Assigned" state.

After the data transfer is complete, the local peer entity may initiate a "clear_request" to clear a CID state, whereby a "clear_request" signal or message is sent to the remote peer entity. The remote peer entity then clears the CID's "Assignment_initiated" state to an "Unassigned" state and returns a "Clear_confirm" message or signal back to the local peer entity. Upon receipt of the "Clear_confirm" message or signal, the local peer entity clears the CID's state to an "Unassigned" state in the ANP memory table. Accordingly, the previously requested CID is released. The release of CID may also be required if the channel assignment is denied, i.e. "Assignment_denied" or "Removal_initiated" is received. The local peer entity may decide to use a new "Unassigned" CID from the ANP memory table of the local peer entity.

In existing systems, the CIDs available for each AAL2 link are limited to 256 (248 of which are generally available for users and 8 of which are generally for system management use), and the peer entities are symmetrical in their functionality regarding channel assignment requests. Further, in existing systems, there is no provision from one peer entity to find out the status of CID at a remote peer entity. Due to the above reasons, a conflict or collision has been described in the above discussion where both local and remote peer entities receive channel assignment requests asynchronously, and the same CID is chosen for respective channel assignment request at each peer entity. "Assignment_request" messages sent between the peer entities requesting to assign the same CID for two different channel assignment requests are denied since the CIDs have already been assigned to the "Assignment_initiated" state. This situation leads to a conflict on CID assignment resulting in both requests failing for the reason that they tried to assign the same CID for two different requests on a single AAL2 link.

Figure 2:
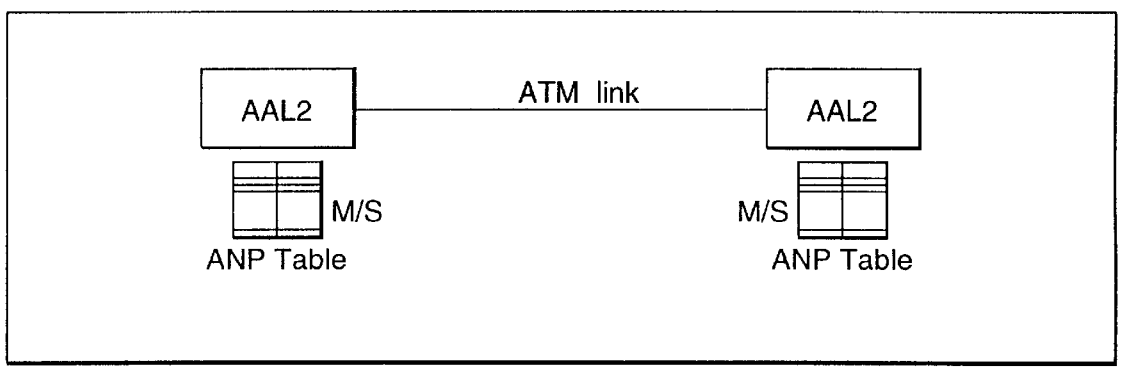
FIG. 2 illustrates a point-to-point AAL2 connection in resolving a channel assignment conflict in accordance with the present invention.

FIG. 2 illustrates a peer-to-peer (or called point-to-point) AAL2 connection in resolving channel assignment conflict in accordance with the present invention. A flag represented as M/S (Master/Slave) is associated with a respective peer entity, i.e., a local peer entity has a M/S flag, and a remote peer entity has another M/S flag. During an initialization phase of the peer entities, the flag value is negotiated in such a way that one peer entity is in a M(Master) mode and the other one in a S(Slave) mode. When there is a conflict in CID assignment, each peer entity checks the status of its own M/S flag. If the flag value indicates M(Master), then the respective peer entity denies the CID assignment requested by the other peer entity by returning the "Assigmnent_denied" message. If the flag indicates S(Slave), then the peer entity satisfies the other peer entity by assigning the channel to the other user. Generally, one of the two peer entity is a Master peer entity, and the other one is a Slave peer entity. When the Slave peer entity receives the "Assignment_denied" message for its own channel assignment request, a new CID may be chosen from the "Unassigned" CID, and the ANP may be started all over again. Alternatively, the Slave peer entity may choose to wait until the vacancy of the channel occupied by the Master peer entity by setting a waiting time.

The pseudo-code description to implement the resolution of channel assignment conflict in accordance with the present invention can be as follows:

Initialization

```
                Start a random_timer
                IF Timer expires THEN
                    send a message with M flag
                    get response S flag from remote
                    IF Success THEN
                        M/S Flag initialization completed
                    ELSE
                        retry the initialization procedure
                    END IF
                END IF
```

Resolve conflict

```
IF Message == channel assignment request THEN
    IF Conflict on CID assignment
        check the status of M/S flag
        IF Flag == "M" THEN
            send assignment_denied to remote peer entity
        ELSE IF Flag == "S" THEN
            assign the channel as per remote peer entity's request
            send assignment_confirm message to remote peer entity
        END IF
    END IF
ELSE IF Message == assignment_confirm THEN
            complete channel assignment
            inform local user
ELSE IF Message == assignment_denied THEN
            choose a new CID among "Unassigned" CID
            restart the ANP again
END IF
```

After a collision, according to the above pseudo-code, one of the channel assignment request is guaranteed to succeed. Even the failed channel assignment request is restarted as soon as the "Assignment_denied" message is received by the peer entity. In addition, the M/S flags at both entities are alternated (M=>S and S=>M) after each collision, so that fairness is maintained between peer entities in channel assignments. Accordingly, the present invention provides each peer entity an equal opportunity to succeed on their local channel assignment requests. Further, the present invention significantly improves the efficiency of the channel assignment, increases the call success rate, and does not introduce any additional delay after a conflict.

It will be appreciated that other pseudo-code descriptions can be used to initialize the M/S flag and/or to resolve conflict without departure from the principles of the present invention.

Figure 3:
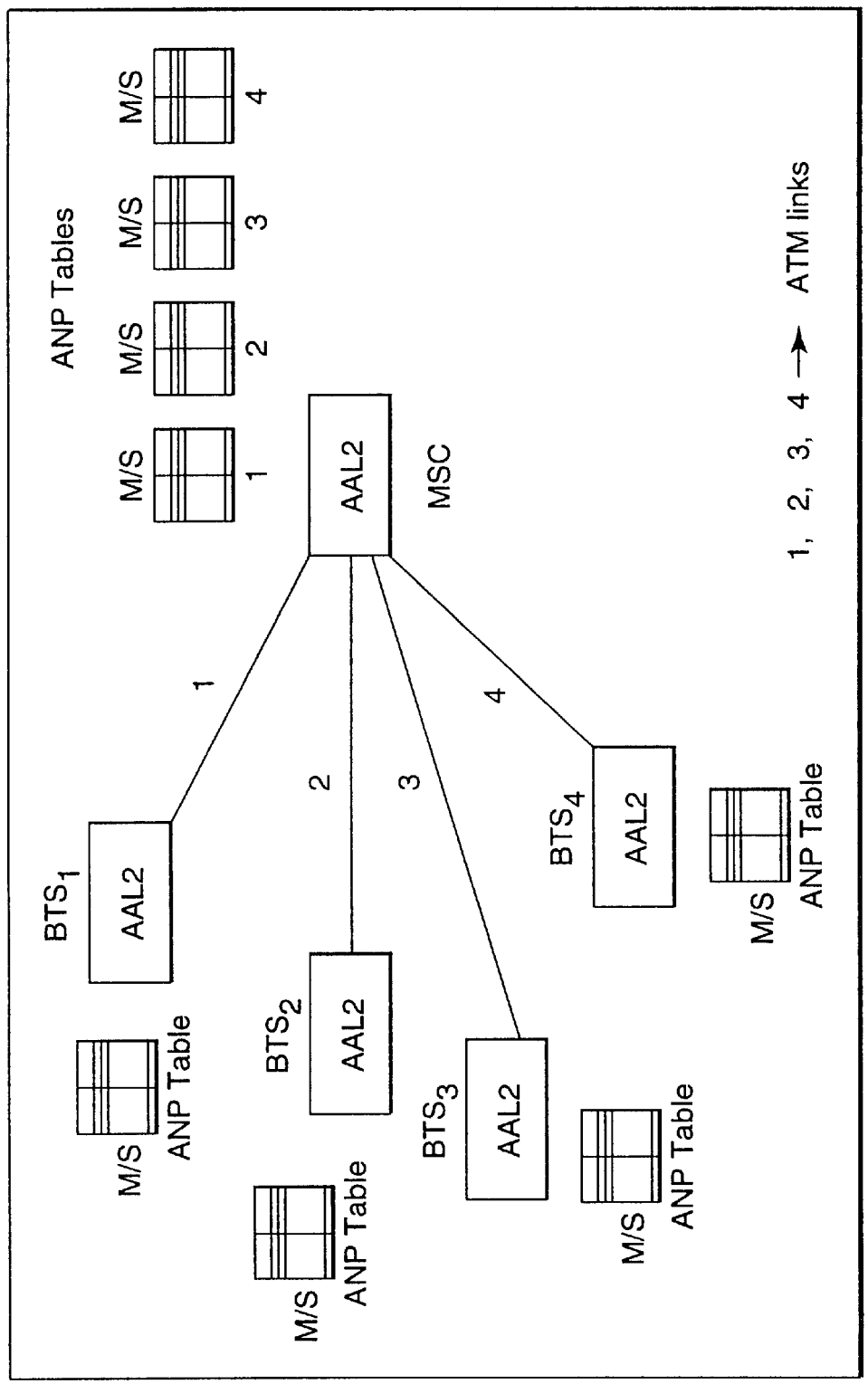
FIG. 3 illustrates a point-to-multi-point AAL2 connection in resolving a channel assignment conflict in accordance with the present invention.

FIG. 3 illustrates a point-to-multi-point AAL2 connection in resolving channel assignment conflict in accordance with the present invention. In this example, several Base Transmission (or Transceiver) Systems (BTSs) are connected to a single Mobile Switching Center (MSC) through separate AAL2 connections. In the embodiment shown in FIG. 3, a single ANP memory table is associated with each BTS, and a separate M/S flag is maintained for each ANP memory table at MSC. Each AAL2 link is similar to the point-to-point (or peer-to-peer) link embodiment discussed in FIG. 2, and the dynamic channel assignment is carried out in the same manner as the method discussed in FIGS. 1 and 2.

In FIG. 3, when there is a conflict or collision, MSC makes an additional verification of which peer entity request has caused the collision. Once the identification is confirmed, the M/S flag of the respective peer entity is verified, and the conflict can be resolved similar to the case of point-to-point embodiment.

Further in FIG. 3, the state of the M/S flags at MSC varies at random, for example, M, M, S, M, and S means that the MSC acts as Master, Master, Slave, Master, Slave for the corresponding links at the same time. Further, synchronization can also be made by the same method as described in the point-to-point embodiment on an individual link basis.

Figure 4:
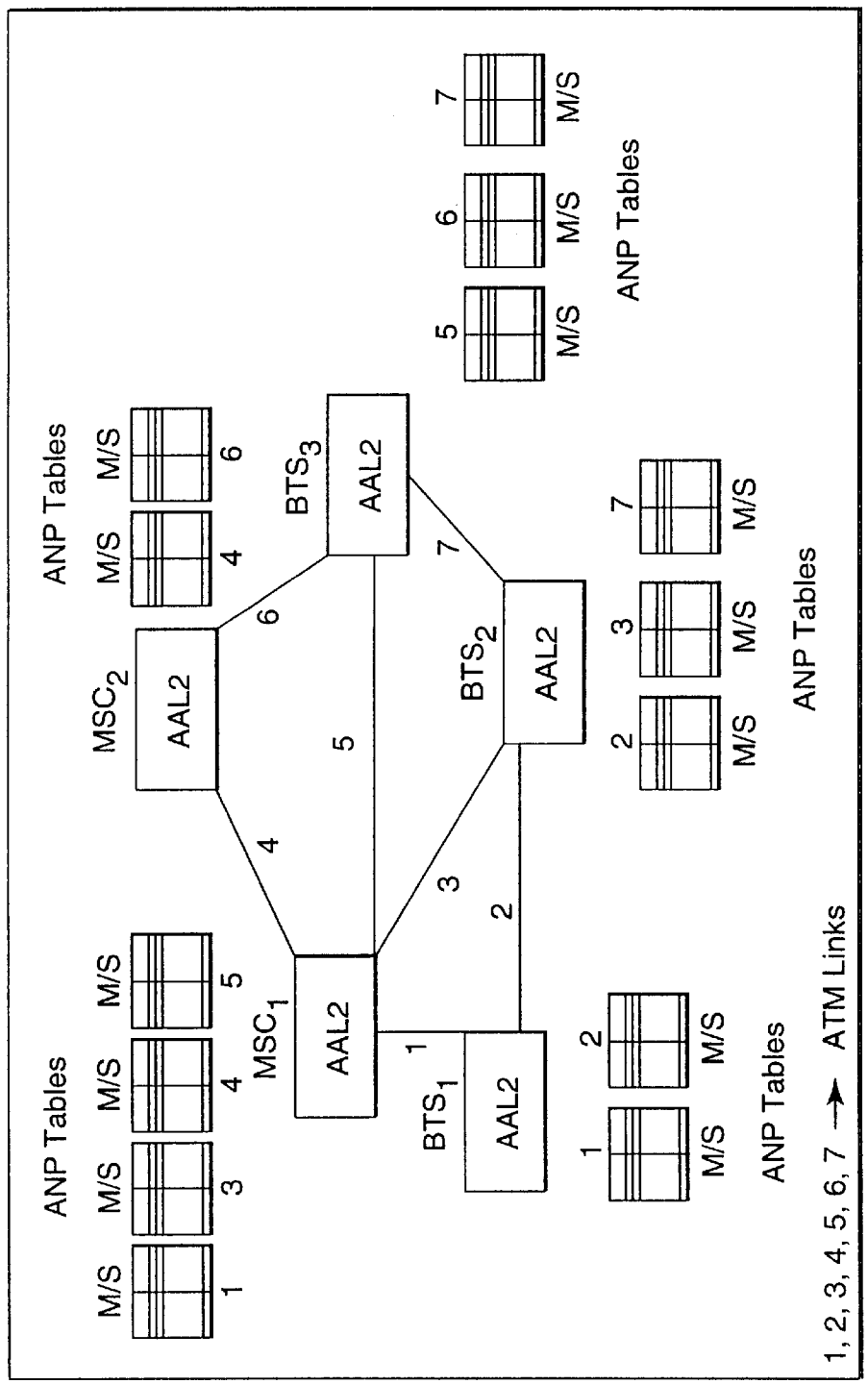
FIG. 4 illustrates a distributed environment in resolving a channel assignment conflict in accordance with the present invention.

FIG. 4 illustrates a distributed AAL2 environment in resolving channel assignment conflict in accordance with the present invention. In this embodiment, a number of BTSs and MSCs are interconnected to each other by a separate ATM connection. At each peer entity, a separate ANP memory table and M/S flag are associated with each ATM link connected to it. Each peer entity may resolve a conflict in a similar way with a similar implementation as described in the point-to-multi-point configuration as shown in FIG. 3.

It will be appreciated that the present invention can apply to other distributed environments.

In addition, the BTSs and MSCs as shown in FIGS. 3 and 4 can be any conventional BTS and MSC. These conventional communication systems are merely for an illustration purpose, not for a limitation. It will be appreciated that the principles of the present invention can be used in other communication systems or even in other connection areas.

Figure 5B:
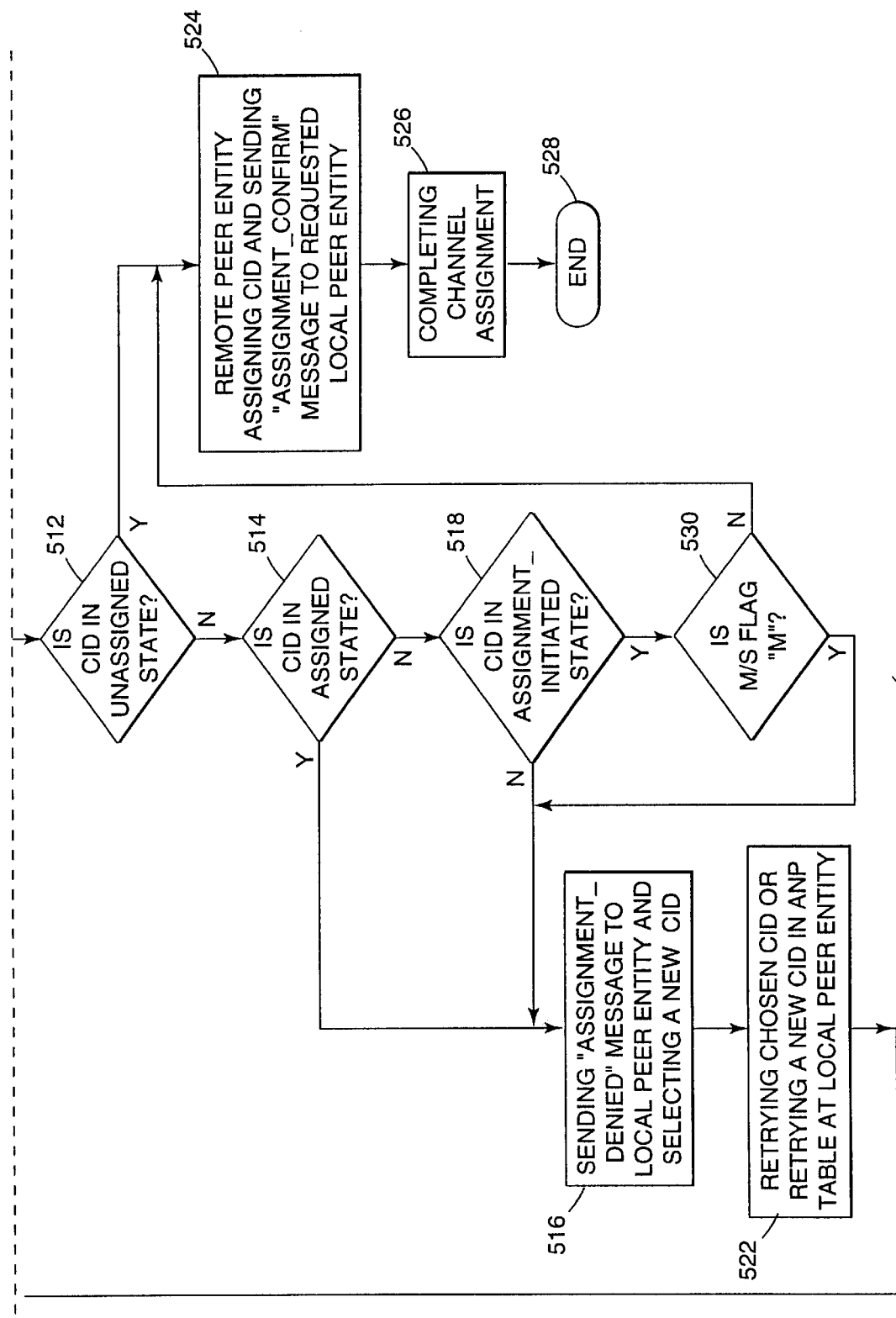
FIG. 5 is a flow chart illustrating an operation of peer-to-peer AAL2 connection in accordance with the present invention.

FIG. 5 is a flow chart illustrating an operation of point-to-point (or peer-to-peer) AAL2 connection in accordance with the present invention. The flow chart provides a summary of the basic operation. It is only for an illustration purpose, not for a limitation purpose.

The operation starts with box 500. First, a connection request for a channel between a local peer entity and a remote peer entity is received at the local peer entity, as shown in box 502. The local peer entity then chooses a CID among channels which are in a "Unassigned" state as shown in box 504. Next, the local peer entity changes the state of the chosen CID to "Assignment_initiated" as shown in box 506 and sends an "Assignment_request" message to the remote peer entity, and meanwhile starts a timer to set limit on the waiting time of receiving message from the remote peer entity as shown in box 508. The remote peer entity, upon receiving "Assignment_request", verifies the state of the requested CID in its own ANP memory table as shown in box 510. If the CID is in an "Unassigned" state as determined from box 512, the remote peer entity assigns the requested CID and returns an "Assignment_confirm" message or signal to the local peer entity as shown in box 524. Then, the local peer entity completes the channel assignment as shown in box 526. The operation then ends in box 528. If the CID is not in an "Unassigned" state as determined from box 512, the remote peer entity determines whether the CID is in an "Assigned" state from box 514. If the CID is in an "Assigned" state, the remote peer entity sends an "Assignment_denied" message or signal to the local peer entity and may select a new CID for retrying as shown in box 516. If the CID is not in an "Assigned" state as shown from box 514, the remote peer entity determines whether the CID is in an "Assignment_initiated" state as shown in box 518. If the remote peer entity verifies that the requested CID is an "Assignment_initiated" state, i.e. a channel conflict occurs, the remote peer entity determines whether its M/S flag is in a "M" state. If the M/S flag is in a "M" state, the remote peer entity denies the channel assignment for the local peer entity as shown in box 516. If the remote peer entity's M/S flag is in a "S" state, the remote peer entity confirms the channel assignment for the local peer entity as shown in box 524 such that the requested channel is assigned to the local peer entity. This operation stands at the point of view of the remote peer entity. The same determination may occur at the local peer entity.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of peer-to-peer communication in a channel assignment negotiation procedure, comprising the steps of:
   A) receiving a channel request at a first peer entity to connect to a second peer entity;
   B) checking a channel identification memory associated with the first peer entity and choosing a channel identification from the memory which has an unassigned status;
   C) sending an assignment request signal to the second peer entity;
   D) changing the unassigned status of the chosen channel identification in the memory to an assignment_initiated status;
   E) receiving the assignment request signal from the first peer entity at the second peer entity;
   F) checking a channel identification memory associated with the second peer entity to determine whether the chosen channel identification has an unassigned status in the memory associated with the second peer entity:
      1) if the chosen identification has the unassigned status in the memory associated with the second peer entity, sending an assignment_confirm signal back to the first peer entity, and transferring assignment from the first peer entity to the second peer entity;
      2) if the chosen identification has an assignment_initiated status in the memory associated with the second peer entity, checking a M/S flag associated with the second peer entity:
         a) if the M/S flag is M, sending an assignment_denied signal back to the first peer entity, and repeating step B);
         b) if the M/S flag is S, sending the assignment_confirm signal back to the first peer entity, and transferring assignment from the first peer entity to the second peer entity;
      3) if the chosen identification has an assigned status, sending the assignment_denied signal back to the first peer entity, and repeating step B); and
      4) if the chosen identification has a removal_initiated status, sending the assignment_denied signal back to the first peer entity, and repeating step B).

2. The method of claim 1, further comprising a step of initializing a M/S flag associated with the first peer entity and the M/S flag associated with the second peer entity such that one of the first and second peer entities is M and the other one is S.

3. The method of claim 2, further comprising a step of alternating the M and S of the M/S flag associated with the first peer entity and the M/S flag associated with the second peer entity after the M/S flag is checked.

4. The method of claim 1, further comprising additional peer entities connectable to the first peer entity.

5. The method of claim 4, wherein each of the additional peer entities is associated with a channel identification channel and a M/S flag.

6. The method of claim 1, further comprising additional peer entities connectable to the second peer entity.

7. The method of claim 6, wherein each of the additional peer entities is associated with a channel identification channel and a M/S flag.

8. The method of claim 4, further comprising additional peer entities connectable to the second peer entity.

9. The method of claim 8, wherein each of the additional peer entities is associated with a channel identification channel and a M/S flag.

10. A peer-to-peer communication system in a channel assignment negotiation procedure, comprising:
    a first peer entity, the first peer entity being arranged to receive a first channel request;
    a second peer entity, the second peer entity being arranged to receive a second channel request and connectable to the first peer entity via a channel having a channel identification;
    a first channel identification memory associated with the first peer entity storing a first status of the channel identification, the first status of the channel identification being changeable when the first channel request is received;
    a second channel identification memory associated with the second peer entity storing a second status of the channel identification, the second status of the channel identification being changeable when the second channel request is received;
    a first M/S memory associated with the first peer entity;
    a second M/S memory associated with the second peer entity, wherein a M status and a S status are alternatively stored in the first and second M/S memories; and
    wherein when the second peer entity sends a second channel request for a channel identification to the first peer entity before the second peer entity receives a first channel request for the same channel identification from the first peer entity, the second peer entity sends either an assignment_confirm signal or an assignment_denied signal back to the first peer entity depending on the second M/S memory, such that when the second M/S memory has the M status, the assignment_denied signal is sent back to the first peer entity, and when the second M/S memory has the S status, the assignment_confirm signal is sent back to the first peer entity.

11. The peer-to-peer system of claim 10, wherein each of the first and second peer entities are first and second computer communication systems which are arranged to receive the first and second channel requests, respectively.

12. The peer-to-peer system of claim 10, wherein the second peer entity is remotely located from the first peer entity.

13. A peer-to-peer communication system in an assignment negotiation procedure, comprising:
- at least one pair of peer entities connectable by a link having an assignable channel identification, one peer entity of at least the pair of peer entities having a higher priority status than the other peer entity of at least the pair of peer entities;
- means for alternating the higher priority status between the one peer entity and the other peer entity; and
- wherein when the one peer entity of at least the pair of peer entities requests a channel identification for the link at the same time as the other peer entity of at least the pair of peer entities, the channel identification assignment is communicated to the peer entity having the lower priority by the peer entity which has the higher priority status, the higher priority status being alternated between the one and the other peer entity after completion of channel identification assignment.

14. The peer-to-peer system of claim 13, wherein each of the first and second peer entities are first and second computer communication systems which are arranged to receive first and second requests for a same link, respectively.

15. The peer-to-peer system of claim 13, wherein the second peer entity is remotely located from the first peer entity.

16. The peer-to-peer system of claim 13, wherein the assignment negotiation procedure is a channel assignment negotiation procedure.

17. The peer-to-peer system of claim 13, wherein the assignment negotiation procedure is a resource assignment negotiation procedure.

18. An article of manufacture for a computer-based data processing system, the article of manufacture comprising a computer readable medium having instructions for causing a computer to perform a method comprising the steps of:
- A) receiving a channel request at a first peer entity to connect to a second peer entity;
- B) checking a channel identification memory associated with the first peer entity and choosing a channel identification from the memory which has an unassigned status;
- C) sending an assignment request signal to the second peer entity;
- D) changing the unassigned status of the chosen channel identification in the memory to an assignment_initiated status;
- E) receiving the assignment request signal from the first peer entity at the second peer entity;
- F) checking a channel identification memory associated with the second peer entity to determine whether the chosen channel identification has an unassigned status in the memory associated with the second peer entity:
  1) if the chosen identification has the unassigned status in the memory associated with the second peer entity, sending an assignment_confirm signal back to the first peer entity, and transferring assignment from the first peer entity to the second peer entity;
  2) if the chosen identification has an assignment_initiated status in the memory associated with the second peer entity, checking a M/S flag associated with the second peer entity:
     a) if the M/S flag is M, sending an assignment_denied signal back to the first peer entity, and repeating step B);
     b) if the M/S flag is S, sending the assignment_confirm signal back to the first peer entity, and transferring assignment from the first peer entity to the second peer entity;
  3) if the chosen identification has an assigned status, sending the assignment_denied signal back to the first peer entity, and repeating step B); and
  4) if the chosen identification has a removal_initiated status, sending the assignment_denied signal back to the first peer entity, and repeating step B).

* * * * *